United States Patent
Krishnan et al.

(10) Patent No.: US 12,298,449 B2
(45) Date of Patent: May 13, 2025

(54) SENSOR AND COINCIDENCE RADIATION DETECTION DEVICE

(71) Applicant: mDetect Pty Ltd, South Yarra (AU)

(72) Inventors: Shanti Krishnan, Endeavour Hills (AU); Craig Webster, Ringwood East (AU); Alan Duffy, Northcote (AU)

(73) Assignee: mDetect Pty Ltd, South Yarra (AU)

( * ) Notice: Subject to any disclaimer, the term of this patent is extended or adjusted under 35 U.S.C. 154(b) by 445 days.

(21) Appl. No.: 17/641,630

(22) PCT Filed: Sep. 9, 2020

(86) PCT No.: PCT/AU2020/050956
§ 371 (c)(1),
(2) Date: Mar. 9, 2022

(87) PCT Pub. No.: WO2021/046602
PCT Pub. Date: Mar. 18, 2021

(65) Prior Publication Data
US 2022/0326397 A1 Oct. 13, 2022

(30) Foreign Application Priority Data
Sep. 9, 2019 (AU) .................................. 2019903317

(51) Int. Cl.
*G01T 1/172* (2006.01)
*G01T 1/208* (2006.01)

(52) U.S. Cl.
CPC .............. *G01T 1/172* (2013.01); *G01T 1/208* (2013.01)

(58) Field of Classification Search
CPC .......................... G01T 1/172; G01T 1/208
See application file for complete search history.

(56) References Cited

U.S. PATENT DOCUMENTS

| 4,837,437 | A  | * | 6/1989 | Forster | ..................... G01T 1/172 250/363.01 |
| 7,488,934 | B2 | * | 2/2009 | Bryman  | ..................... G01V 5/08 250/266 |

(Continued)

FOREIGN PATENT DOCUMENTS

| CN | 105980885 A    | 9/2016 |
| KR | 2015-0106123 A | 9/2015 |
| WO | 2015/141098 A1 | 9/2015 |

OTHER PUBLICATIONS

Cremat Inc., "Why use charge sensitive preamplifiers?", from the Internet: «https://web.archive.org/web/20171226101442/https://www.cremat.com/why-use-csps/». (Year: 2017).*

(Continued)

*Primary Examiner* — Chih-Cheng Kao

(57) ABSTRACT

A sensor for a coincidence radiation detection device comprises a photomultiplier device to receive incident optical pulses of photons from an associated scintillator device and responsively generate an input electrical signal having corresponding electrical pulses. A charge sensitive amplifier receives the input electrical signal and outputs an electrical signal. An edge-peak detector circuit detects a fast rising edge of the electrical pulses; a beginning of a trailing edge of the electrical pulses; and a peak value of the electrical pulses. A local microcontroller includes: a timing circuit to generate timestamp values for detected pulses in response to a detected pulse edge and to synchronise the timestamp values with a reference clock signal to generate timestamp values for the pulses; an analog to digital converter to record pulse height values of the electrical pulses; and a communications interface to communicate the timestamp values and pulse height values to a memory device.

18 Claims, 13 Drawing Sheets

(56) References Cited

U.S. PATENT DOCUMENTS

| | | | |
|---|---|---|---|
| 7,521,682 B1* | 4/2009 | Holland | G01T 1/17 |
| | | | 250/370.08 |
| 9,435,897 B2 | 9/2016 | Roy | |
| 2009/0128104 A1* | 5/2009 | Mandal | G05F 1/575 |
| | | | 323/273 |
| 2009/0250616 A1 | 10/2009 | Solf et al. | |
| 2010/0010343 A1 | 1/2010 | Daghighian et al. | |
| 2011/0001053 A1* | 1/2011 | Solf | G01T 1/249 |
| | | | 250/370.08 |
| 2012/0025091 A1* | 2/2012 | Wu | G01T 1/1647 |
| | | | 250/394 |
| 2012/0153166 A1* | 6/2012 | Gueorguiev | H04J 3/0667 |
| | | | 250/362 |
| 2014/0021356 A1* | 1/2014 | Zwaans | G01T 1/2985 |
| | | | 250/362 |
| 2014/0158525 A1* | 6/2014 | Greene | C02F 1/46104 |
| | | | 318/400.29 |
| 2014/0306117 A1 | 10/2014 | Vacheret et al. | |
| 2014/0336987 A1 | 11/2014 | Frach et al. | |
| 2014/0367577 A1 | 12/2014 | Badawi et al. | |
| 2016/0118884 A1* | 4/2016 | Fernald | G06F 1/3287 |
| | | | 323/268 |
| 2019/0018154 A1* | 1/2019 | Olcott | G01T 1/2985 |

OTHER PUBLICATIONS

Stmicroelectronics, Achieving 32-bit timer resolution with software expansion for STM32Cube and Standard Peripheral Library, AN2592 Application note, DocID13711, Rev 4. (Year: 2016).*

European Patent Application No. 20862243.1, Extended European Search Report, 8 pages, Sep. 11, 2023.

International Application No. PCT/AU2020/050956, International Search Report, Written Opinion, 13 pages, Nov. 10, 2020.

Lauritzen, Magne Eik et al., "A Silicon Photomultiplier Based Readout System for a Cosmic Muon Telescope; Design and Implementation," Master's Thesis, 219 pages, Jun. 2017.

The Pierre Auger Collaboration, "Muon Counting Using Silicon Photomultipliers in the AMIGA Detector of the Pierre Auger Observatory," JINST, 24 pages, Oct. 4, 2017.

* cited by examiner

Fig. 13

SENSOR AND COINCIDENCE RADIATION DETECTION DEVICE

CROSS-REFERENCE TO RELATED APPLICATIONS

This application is a national stage of International Application No. PCT/AU2020/050956 filed on Sep. 9, 2020; which claims the benefit of and priority to Australian Patent Application No. 2019903317 filed on Sep. 9, 2019; the entire contents of each of which are incorporated herein by reference for all purposes.

FIELD OF THE INVENTION

The present application relates to detection of radiation and in particular to a sensor and coincidence radiation detection device for detecting sub-atomic particles such as cosmic rays.

Embodiments of the present invention are particularly adapted for detection of sub-atomic particles such as muons. However, it will be appreciated that the invention is applicable in broader contexts and other applications.

BACKGROUND

Cosmic rays are high-energy particles travelling through the interstellar space and constitute a continuous flux impinging on the Earth's atmosphere. Relativistic muons are the most penetrating interaction product of the cosmic rays, which reaches the Earth's surface. Studies have estimated that approximately 10,000 muons per square meter hit the Earth's surface each minute. Muons are able to be detected after penetrating thousands of meters of matter before attenuation.

Direct detection and study of cosmic ray showers are traditionally carried out using coincidence measurement techniques, as they allow for a determination of the directional trajectories of high-energy particles from cosmic rays and for muon tomography. Conventional coincidence techniques rely on photomultiplier tubes (PMTs) as the detector for light from plastic scintillators that respond to the radiation. PMTs require a high voltage supply which is typically greater than 700 V for operation. Furthermore, PMTs are fragile, expensive and relatively large (>20 mm). In the field, timing and pulse height measurements obtained by PMT-based techniques use specialised analog front-end instrumentation modules that are typically mounted on crates, making the overall systems large and cumbersome. Signal analysis in these systems is usually performed by data acquisition card on a separate PC.

More recently, Silicon Photomultipliers (SiPMs) in conjunction with specialised dedicated instrumentation modules have been used as detectors for measuring coincidences. It is known to replace PMTs with SiPMs to remove the need for a high voltage supply. However, there are some inherent challenges in utilizing these devices effectively due to potential large dark current, temperature sensitivity and inherent capacitance in the SiPMs.

Designs for software-based coincidence timing have also been explored. However, analog front-ends for these coincidence systems still use specialised electronic modules. While these systems are custom-built and are very useful, they have limitations, especially when multiple coincidence systems are required to be deployed for initial field validation or background measurements, owing to their high cost and labour to build.

Any discussion of the background art throughout the specification should in no way be considered as an admission that such art is widely known or forms part of common general knowledge in the field.

SUMMARY OF THE INVENTION

In a first aspect of the present invention, there is provided a sensor for a radiation detection device, the sensor including a single integrated circuit board comprising:
  a photomultiplier device powered by an input power signal and configured to receive incident optical pulses of photons from an associated scintillator device and, in response, generate an input electrical signal having corresponding electrical pulses;
  a charge sensitive amplifier configured to receive the input electrical signal and output an amplified electrical signal in which the electrical pulses are amplified and stretched in time;
  an edge-peak detector circuit configured to detect:
    a fast rising edge of the electrical pulses;
    a beginning of a trailing edge of the electrical pulses; and
    a pulse peak value being a voltage value measured at the beginning of the trailing edge of the electrical pulses;
  a local microcontroller having:
    a timing circuit configured to generate timestamp values for each of the detected pulses in response to a detected pulse edge and to synchronise the timestamp values with a reference clock signal to generate timestamp values for the pulses;
    an analog to digital converter configured to record pulse height values of the electrical pulses; and
    a communications interface configured to communicate the timestamp values and pulse height values to a memory device.

In some embodiments, the photomultiplier device is a silicon photomultiplier.

In some embodiments, the sensor includes a bias voltage power supply circuit located on the circuit board and configured to receive a signal from an external power source and generate the input power signal.

In some embodiments, the reference clock signal is an internally generated signal from a crystal oscillator device. In other embodiments, the reference clock signal is an external timing signal received from an external device.

In some embodiments, the sensor includes a temperature sensor mounted close to the silicon photomultiplier and in communication with the local microcontroller for monitoring a temperature of the silicon photomultiplier.

In some embodiments, the charge sensitive amplifier includes an operational amplifier circuit. In one embodiment, the charge sensitive amplifier includes a pair of back-to-back Schottky diodes connected across the input of the operational amplifier.

In some embodiments, the memory is internal to the sensor. In other embodiments, the memory is part of an external device.

In some embodiments, the bias voltage power supply circuit includes a hybrid power supply circuit to convert an unregulated power signal to the input power signal delivered to the photomultiplier. In one embodiment, the hybrid power supply circuit includes a combination of a switch mode power supply regulator and a linear regulator to reduce voltage ripple in the input power signal.

Preferably, the timing circuit includes at least a 17-bit timer. In some embodiments, the timing circuit includes a timer in the range of 17 to 31 bits that is formed of two 16-bit timers operating at different speeds and both timers are derived from a common clock source. In some embodiments, the 17 to 31-bit timer is formed of a 16-bit fast timer and a 16-bit slow timer, wherein the 16-bits of the slow timer are combined with the 1 to 15 least significant bits of the fast timer to produce the 17 to 31-bit timer. In one embodiment, the fast 16-bit timer runs in the MHz range and the slow 16-bit timer runs in the kHz range.

In a second aspect of the present invention, there is provided a coincidence radiation detection device comprising:
 a plurality of sensors according to any one of the preceding claims; and
 a central controller unit in data communication with each of the plurality of sensors, the central controller unit configured to:
  receive the timestamp values and pulse height values from each sensor;
  synchronise the reference clock signals of each sensor to a common clock signal; and
  process the timestamp values and pulse height values in conjunction with the common clock signal to determine coincidence events in which pulses are simultaneously detected across at least two of the sensors.

In some embodiments, the central controller unit processes the timestamp values and pulse height values in real-time or near real-time. In some embodiments, the central controller unit is in data communication with one or more sensor devices for receiving pressure and/or temperature data of a local environment in which the device is located. In one embodiment, the central controller unit is in data communication with an accelerometer for receiving data indicative of an orientation of the device. In one embodiment, the central controller unit includes memory for storing the timestamp values and pulse height values from each sensor.

In some embodiments, the local microcontroller of the sensor is further configured to apply a correction factor to timestamp values of a subsequent reference clock cycle. In one embodiment, the correction factor is calculated from a previous reference clock cycle.

In a third aspect of the present invention, there is provided a method of producing a 17 to 31-bit timing device from two 16-bit timing devices which are derived from a common clock source, the method comprising:
 configuring a first 16-bit timer to run at a first speed;
 configuring a second 16-bit timer to run at a second speed that is lower than the first speed;
 combining all 16 bits of the second 16-bit timer with a subset of the bits of the first 16-bit timer representing a desired number of least significant bits.

In some embodiments, the first 16-bit timer is configured to run in the MHz frequency range. In some embodiments, the second 16-bit timer is configured to run in the KHz frequency range.

In some embodiments, all 16 bits of the second 16-bit timer are combined with the 5 least significant bits of the first 16-bit timer to produce a 21-bit timer.

In a fourth aspect of the present invention, there is provided a 17 to 31-bit timing device, comprising:
 a first 16-bit timer configured to run at a first speed;
 a second 16-bit timer configured to run at a second speed that is lower than the first speed;
 wherein, all 16 bits of the second 16-bit timer are combined with a subset of the bits of the first 16-bit timer representing a desired number of least significant bits.

In some embodiments, the device includes a timing circuit for combining the timers together.

In some embodiments, the first 16-bit timer is configured to run in the MHz frequency range. In some embodiments, the second 16-bit timer is configured to run in the KHz frequency range.

In some embodiments, all 16 bits of the second 16-bit timer are combined with the 5 least significant bits of the first 16-bit timer to produce a 21-bit timer.

BRIEF DESCRIPTION OF THE FIGURES

Example embodiments of the disclosure will now be described, by way of example only, with reference to the accompanying drawings in which:

FIG. 13 illustrates sample timestamped data streams for three test cases with and without a correction factor and GPS as the PPS source.

DESCRIPTION OF THE INVENTION

Embodiments of the present invention are described herein with reference to the application of a cosmic ray detector for detecting cosmic muons. One particular application is the detection and location of specific bodies of ore, or improving knowledge of rock structures more generally, to aid in the detection of gold buried underground. However, it will be appreciated that the invention is also capable of detecting a broader range of sub-atomic particles such as alpha and beta particles, as well as gamma rays. The invention also has broader applications such as determining air pockets in block caving, carbon sequestration, non-invasive internal scanning of pipes or vessels that traditional penetrating techniques are ineffective, and medical imaging.

System Overview

Figure 1:
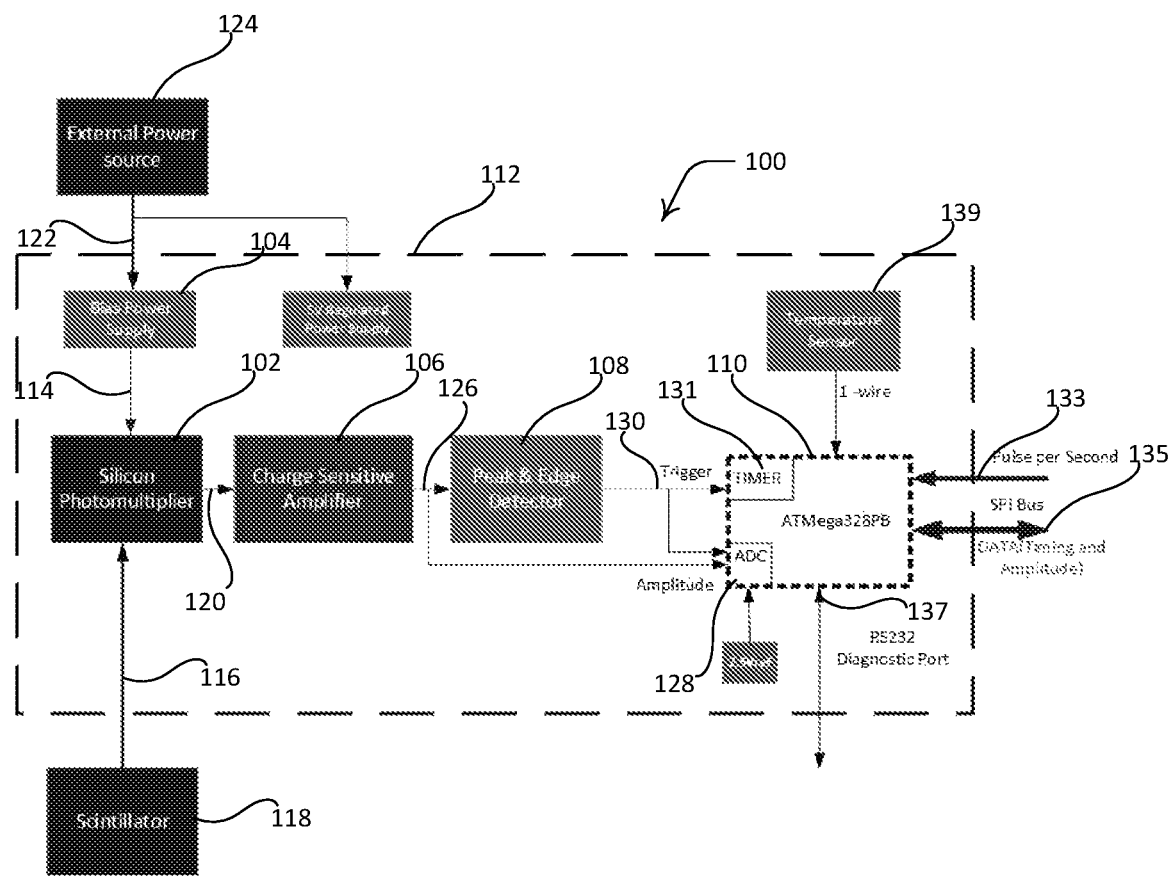
FIG. 1 is a schematic system-level diagram of a sensor for detecting sub-atomic particles.
Figure 2A:
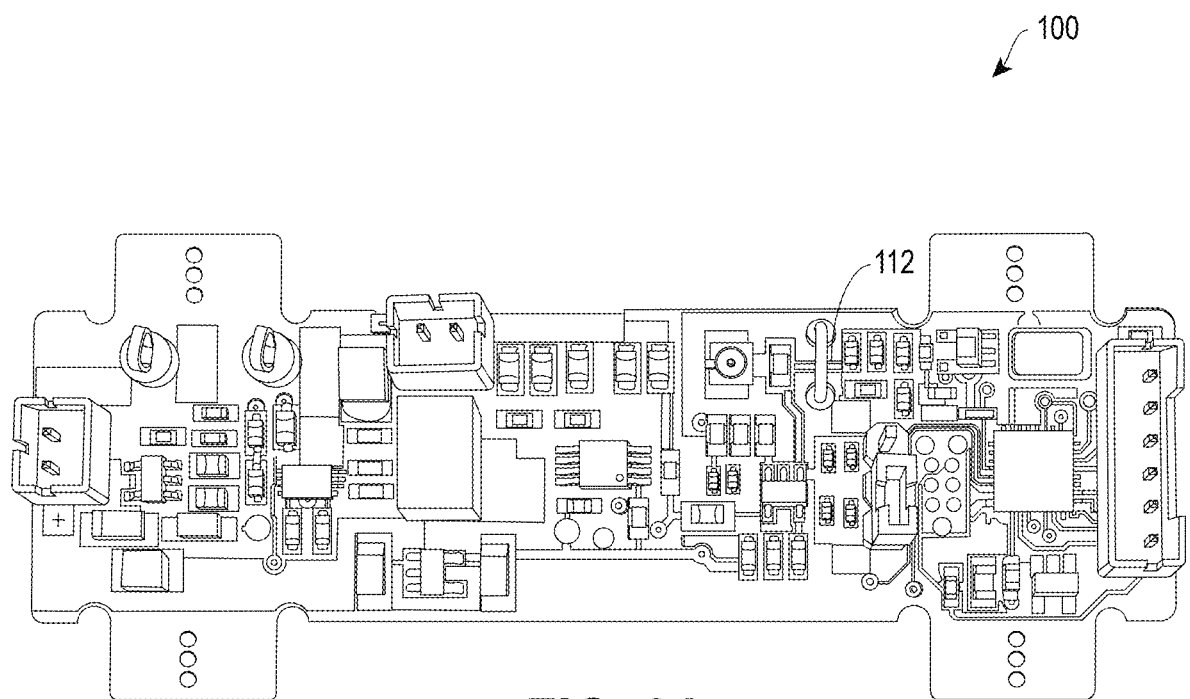
FIG. 2A is a top plan view of a sensor for detecting sub-atomic particles formed on a single integrated circuit board.
Figure 2B:
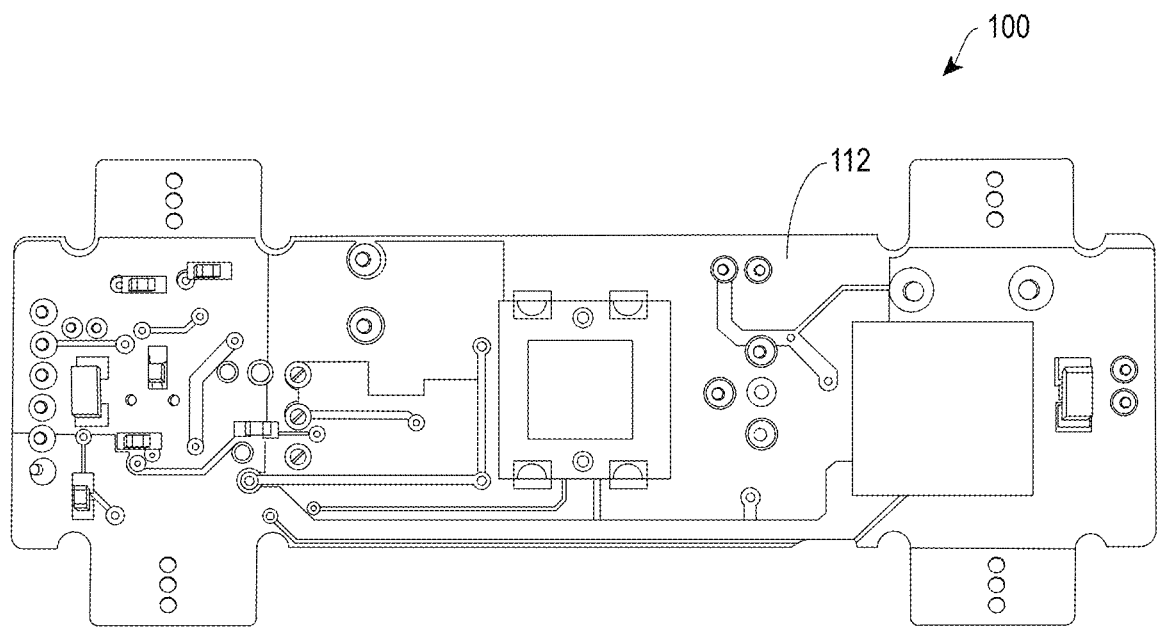
FIG. 2B is a bottom plan view of the sensor of FIG. 2A.

Referring initially to FIGS. 1 and 2, there is illustrated a sensor 100 for detecting sub-atomic particles. Sensor 100 is suitable for integration into a radiation detection device such as the coincidence radiation detection device 300 illustrated in FIG. 3. As will be described in detail below, sensor 100 includes a photomultiplier device such as a silicon photomultiplier (SiPM) 102 driven by a bias voltage supply circuit 104. A charge sensitive amplifier 106 is configured to amplify and stretch output electrical pulses from SiPM 102. An edge-peak detector circuit 108 detects and generates a trigger for rising edge pulse timing and maximum peak height values, and a local microcontroller 110 performs critical edge timing and pulse height measurement, as well as other functions. The operation of sensor 100 (called a "smart sensor") and the various components are described in detail below.

Smart Sensor Operation

As best illustrated in FIG. 2, sensor 100 is formed on a single integrated circuit board 112, and preferably all electrical components are mounted thereon. However, as described below, in some embodiments, a subset of the components of sensor 100 may reside separate to circuit board 112.

As mentioned above in relation to FIG. 1, sensor 100 includes a photomultiplier device such as a silicon photomultiplier (SiPM) 102. SiPM 102 is powered by an input power signal 114 and configured to receive incident optical pulses 116 of photons from an associated scintillator device 118 and, in response, generate an input electrical signal 120 having corresponding electrical pulses.

SiPM 102 may be connected to scintillator device 118 in a number of different ways. In one embodiment, SiPM 102 is in direct contact with scintillator device 118 to provide a direct coupling between the two components. When SiPM 102 is mounted on circuit board 112, the circuit board will provide physical support to hold SiPM 102 in position onto the scintillator device 118. This embodiment enables all components to be contained on one circuit board.

In another embodiment, a light guide (similar in principle to an optical fibre) is used to bridge a gap between scintillator device 118 and SiPM 102. This arrangement is typically used when the shape of scintillator device 118 does not match the shape of SiPM 102.

In a further embodiment, SiPM 102 is mounted on scintillator device 118 separate from circuit board 112, and the separate SiPM/scintillator is electrically connected to circuit board 112 via an electrical connection.

In each of the embodiments above, an optical coupling grease or index matching gel may be employed between scintillator device 118 and SiPM 102 or the light guide for reducing optical reflections and improving a signal-to-noise ratio.

Scintillator device 118 may be any commercially available scintillator device suitable for converting energy from incident charged particles (such as muons) into corresponding pulses 116 of photons. By way of example, a suitable scintillator device is a Bicron BC-408 plastic scintillator (Polyvinyltoluene-PVT).

Similarly, SiPM 102 may be any commercially available device such as an FC-6035 6 mm SiPM manufactured by SensL Technologies Ltd (owned by ON Semiconductor), which includes an array of avalanche photodiode microcells operated in the Geiger mode and connected in parallel to a common output. SiPM 102 produces a uniform and quantised amount of charge which is directly proportional to the number of incident photons. In some embodiments, SiPM 102 converts the scintillation pulses into electrical pulses of width of about 2 μs.

An SiPM type photomultiplier is selected as a preferred scintillation detector as it has the physical benefits of compactness, robustness, low operating voltage and low cost while having a gain comparable to a Photomultiplier tube (PMT). These features make it suitable for use in the design of modular coincidence systems which are easily scalable. The main challenges in using an SiPM are noise (dark counts), high capacitance, sensitivity to temperature, and physical coupling to the scintillator due to the small surface area of the SiPM (6 mm×6 mm). In other embodiments, SiPM 102 may be replaced with other types of photomultiplier such as conventional photomultiplier tubes, hybrid photomultiplier tubes, conventional silicon or germanium photodiodes or Large-Area Avalanche Photo-diode (LAAPD).

The input power signal 114 is provided by a bias voltage power supply circuit 104 located on circuit board 112, which is configured to receive a power signal 122 from an external power source 124 such as a mains power supply or battery and generate the input power signal 114.

Figure 4:
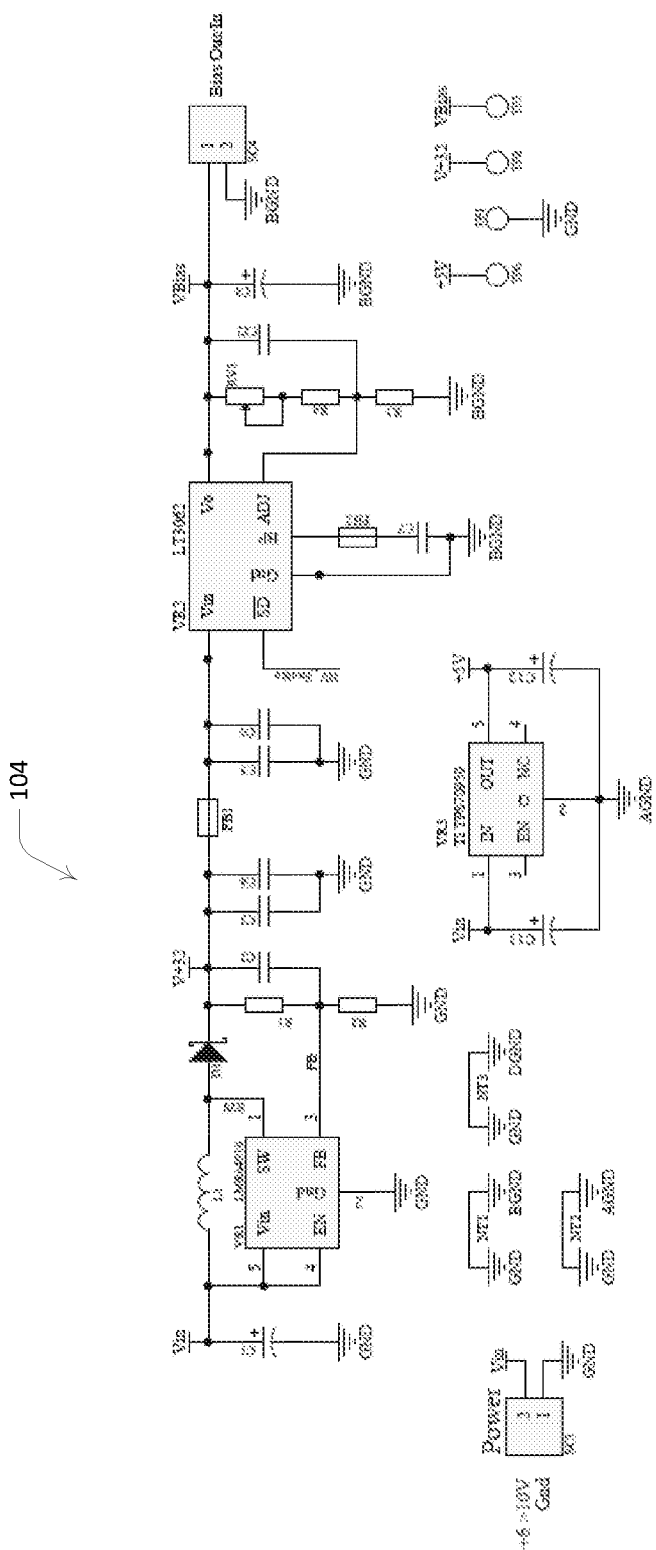
FIG. 4 is a circuit diagram of a hybrid bias voltage power supply circuit suitable for powering the sensors of FIGS. 1-4.

In some embodiments, bias voltage power supply circuit 104 includes an adjustable hybrid power supply circuit to convert an unregulated power signal 122 to the input power signal 114 delivered to SiPM 102. An example hybrid power supply circuit is illustrated schematically in FIG. 4. In this illustrated embodiment, all the components in sensor 100 are supplied by a distributed unregulated+7 V power supply. SiPM 102 requires a base voltage of +24.5 V+overvoltage. This is achieved by using a hybrid power supply generated using a combination of Switch Mode Power Supply regulator (SMPS) LMR64010 and linear regulator LT3062, as shown in the circuit. The LMR64010 SMPS is used to step up the voltage from +7 V to +32 V. However, as it has an output voltage ripple of about ~20 mV, SMPS circuit is followed by a linear power supply LT3062, which has a high Power Supply Rejection Ratio (PSRR)/Input ripple rejection of >50 dB at the switching frequency of SMPS (1.6 MHz).

Thus, a combination of SMPS and an adjustable linear power supply reduces the power supply ripple, and is used to generate the required overbias over a range of +25 V to +30 V. As the SensL FC-60035 SiPM has a very low quiescent current requirement (~20 μA), it has been possible to use a single bias power supply ($V_{bias}$) to power up to 4 SiPMs with no additional regulation.

Figure 5:
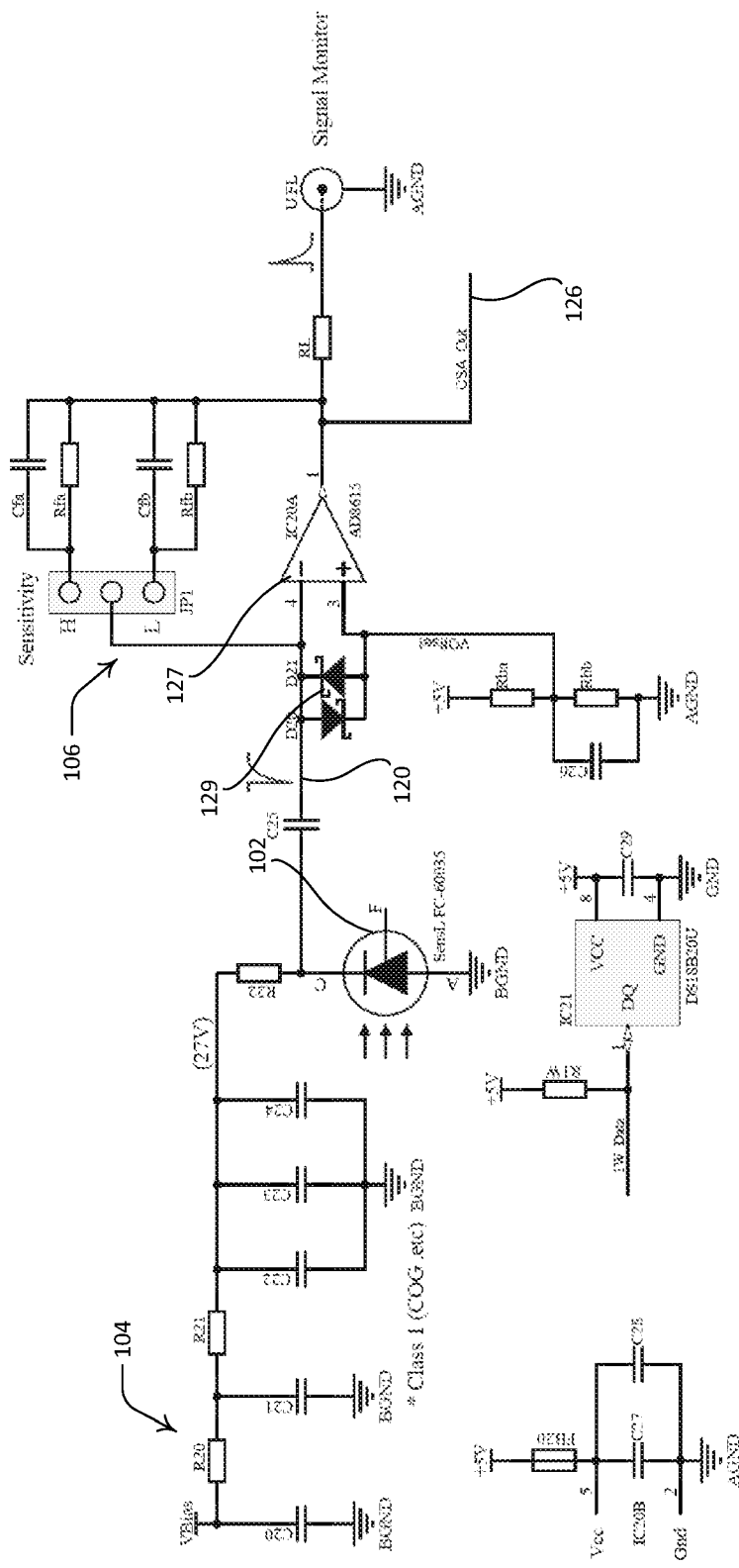
FIG. 5 is a circuit diagram of an analog front end of a sensor as illustrated in FIGS. 1-4 including a charge sensitive amplifier circuit and temperature sensor.

Returning to FIG. 1, the output of SiPM 102 (input electrical signal 120) is connected to an operational amplifier (op-amp) based charge sensitive amplifier (CSA) 106, which receives input electrical signal 120 and outputs an amplified electrical signal 126 in which the electrical pulses are amplified and stretched in time. An exemplary circuit diagram of an analog front end of sensor 100, including CSA 106, is illustrated in FIG. 5.

CSA 106 integrates the SiPM's charge pulses on its feedback capacitor, giving it the characteristics of high noise immunity. The output of CSA 106 is independent of the SiPM's effective high capacitance (nF range), making it suitable for SiPM based muon detection systems. This independence of capacitance is shown by:

$$V_o = Q_d/C_f$$

$$\tau = R_f * C_f \qquad (1)$$

where $V_o$=Voltage Output of CSA; $\tau$=decay time constant; $Q_d$=Charge released by the SiPM; $R_f$=feedback resistor; $C_f$=Feedback capacitor.

$$\begin{aligned} BW &= (GBW * C_f)/(C_{det} + C_f) \qquad (2) \\ &= (24*10^6 * 100*10^{-12})/(3.4*10^{-9} + 100*10^{-12}) \\ &= 6.8 \text{ kHz} \end{aligned}$$

where BW is the Bandwidth of the coincidence system; GBW is the Gain-Bandwidth product of the CSA op-amp and $C_{det}$ is the Capacitance of SiPM.

Using equation 1, the calculated bandwidth of this coincidence system is 6.8 kHz, which is sufficient for the distinct detection of particles such as muons, whose arrival rate on the surface of the Earth is 1 muon/cm²/min.

As illustrated in FIG. 5, CSA 106 uses a large feedback resistor (1 MΩ) to minimise noise ($R_f$ is a noise source). As a result, the bias current must be in the picoampere (pA) range to prevent the output from drifting. CSA 106 includes an op-amp circuit having an op-amp 127 which is required to be compatible with a voltage range (e.g. 0 to +5 V) of an analog to digital converter (ADC) 128 of local microcontroller 110. Op-amp 127 is also required to have the current capability to drive a signal monitor output (up to 50 mA) for testing purposes, peak and edge detector 108 for timing (surge current up to 10 mA), and ADC 128 for pulse height detection. As illustrated in FIG. 5, op-amp 127 may be an AD8615 op-amp by Analog Devices, Inc, which runs on a single+5 V rail, has input bias current of 0.2 pA and has a current capability of (±150 mA). However, it will be appreciated that other suitable components may be used in place of op-amp 127 and CSA 106 more broadly.

As SiPM 102 is directly connected to CSA 106, a large current pulse from SiPM 102 via input electrical signal 120 could drive op-amp 127 into saturation (where the output would hit the positive rail). This would result in a large voltage up to +27 V (representing the bias voltage of the SiPM) across the differential inputs of op-amp 127 and could potentially damage the op-amp, as the maximum differential voltage allowable for this op-amp is 6 V. To prevent this condition, CSA 106 includes back-to-back Schottky diodes 129 that are placed across the input. The non-inverting input is maintained at 0.8 V, to allow for a small undershoot in the output. In some embodiments, it is preferable to define the resistive and capacitive components of CSA 106 to define time constants of around 100 μs as such time constants are suitable to enable local microcontroller 110 to sample the signal.

Figure 6:
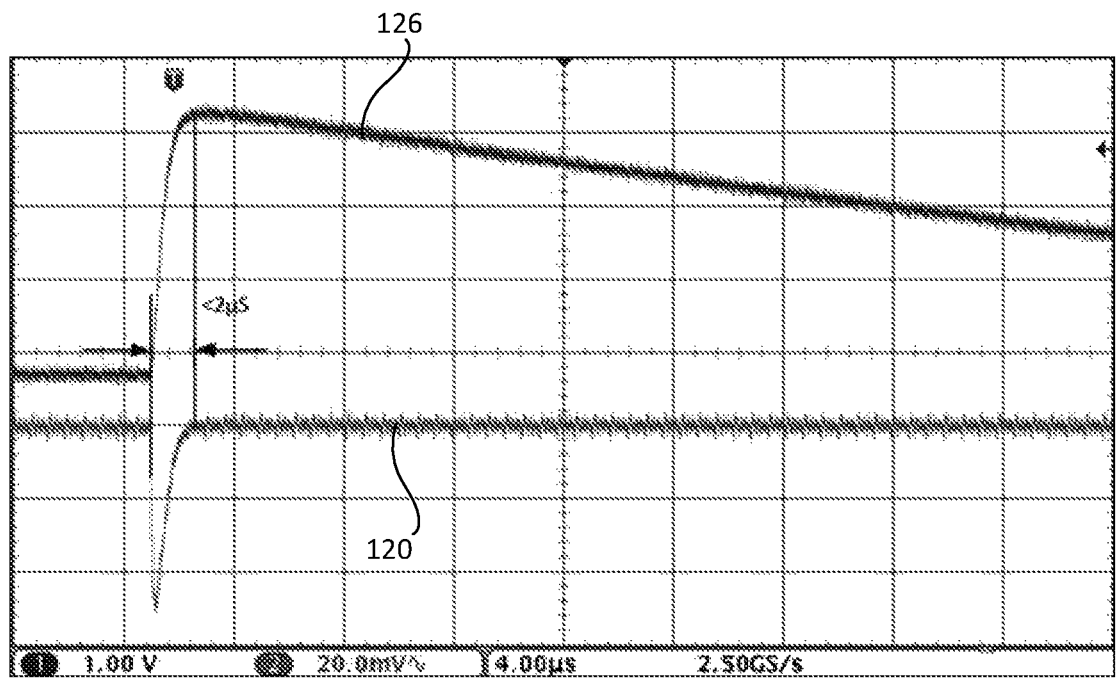
FIG. 6 is a plot of voltage versus time of both an input and an output electrical signal to a charge sensitive amplifier circuit across a short time window around the commencement of a pulse.
Figure 7:
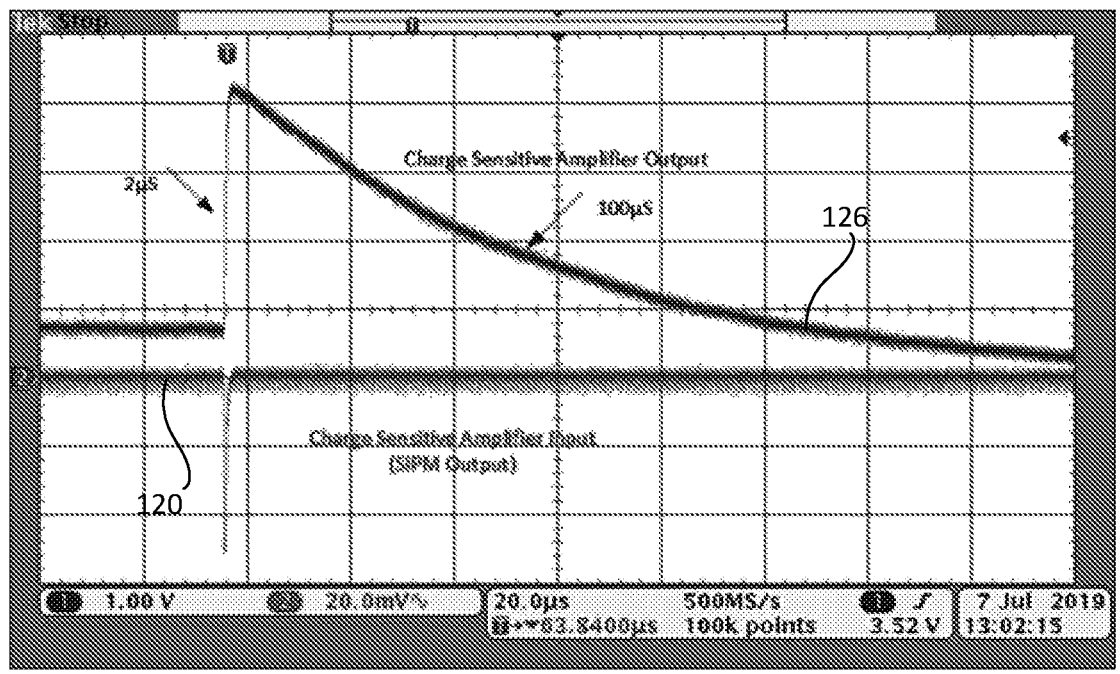
FIG. 7 is a plot of voltage versus time of both an input and an output electrical signal to a charge sensitive amplifier over a wider time window than FIG. 6 and illustrating a slowly decaying trailing edge of a stretched output pulse.

FIGS. 6 and 7 illustrate plots of an exemplary input and output signal from CSA 106 showing a fast rising edge (2 μs) of an electrical pulse and a slow trailing edge ($\tau$=100 μs) generated from a short sharp input pulse from SiPM 102. FIG. 6 illustrates a short time window around the commencement of the pulse while FIG. 7 illustrates a wider time window that more clearly shows the slowly decaying trailing edge of the stretched output pulse is used for peak detection by the microcontroller-based ADC.

Referring again to FIG. 1, CSA 106 outputs amplified electrical signal 126 having amplified and stretched pulses. Amplified electrical signal 126 is transmitted to edge-peak detector circuit 108. An exemplary edge-peak detector circuit 108 is shown schematically in FIG. 8, which utilises an MCP6561-R type op-amp component developed by Microchip Technology Inc. However, it will be appreciated that variations on this design in terms of components and values may be used. Edge-peak detector 108 is configured to perform three main functions:

- Detect a fast rising edge of the electrical pulses from amplified signal 126;
- Detect a beginning of a trailing edge of the electrical pulses from amplified signal 126; and
- Detect a pulse peak value being a voltage value measured at the beginning of the trailing edge of the electrical pulses from amplified signal 126.

Figure 9:
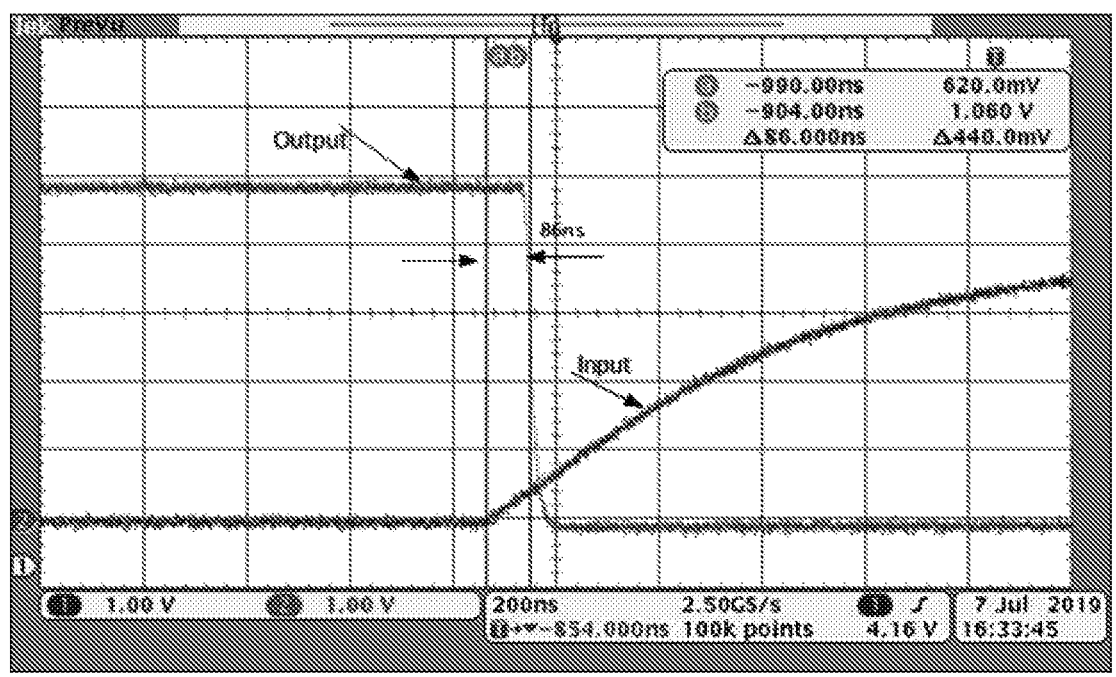
FIG. 9 is a plot of voltage versus time of both an input and an output electrical signal to the edge-peak detector circuit of FIG. 8 across a short time window centred around the commencement of a pulse signal.

In operation, edge-peak detector 108 essentially acts as a high-pass filter generating a logic output pulse which is used to trigger pulse timing for coincidence detection, as well as to start an analog to digital conversion process. FIG. 9 illustrates a plot of a rising edge of an input pulse from amplified signal 126 together with a corresponding output signal of edge-peak detector 108. As illustrated, the first transition of the output of edge-peak detector 108 occurred less than 100 ns after the rising edge of the amplified pulse, and this transition is used to generate a trigger signal 130 to trigger a timestamping timer module 131 of local microcontroller 110 as illustrated in FIG. 1.

Figure 10:
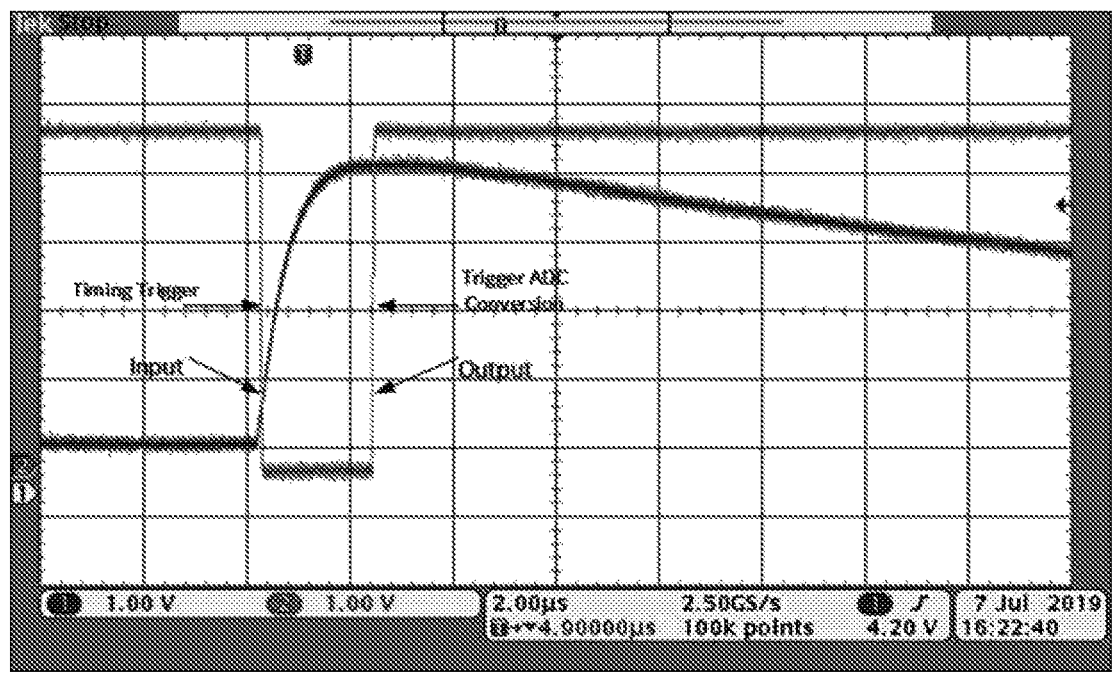
FIG. 10 is a plot of voltage versus time of both an input and an output electrical signal to the edge-peak detector circuit of FIG. 8 across a wider time window showing both a fast leading edge and slow trailing edge of a pulse signal.

Referring now to FIG. 10, there is illustrated an expanded time window of the data of FIG. 9, showing both the rising edge and falling edge of the input pulse from amplified signal 126. As illustrated, a second transition in the output of edge-peak detector 108 occurs as the rising edge rolls off at the peak of the pulse. This second transition is used to start the analog to digital conversion by ADC 128. Thus, the fast rising edge (2 μs) of the pulse output of the CSA, as shown in FIG. 6, is used by edge-peak detector 108 to trigger a timestamping event and send trigger signal 130 to timer module 131, while the slow trailing edge ($\tau$=100 μs), as indicated in FIG. 7, is used for peak detection by the microcontroller-based ADC 128.

Figure 8:
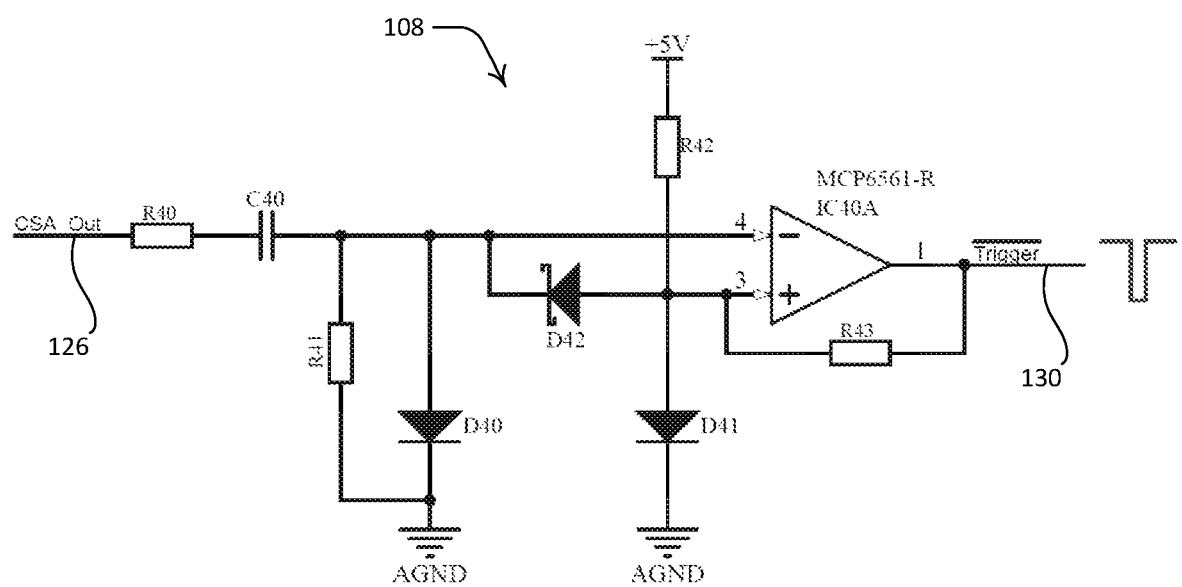
FIG. 8 is a circuit diagram of an edge-peak detector circuit suitable for use in the sensor of FIGS. 1-4.

For validation purposes, the circuit of FIG. 8 was simulated using the LTSpice circuit simulation software produced by Linear Technology Corporation. The results of the actual circuit and simulated circuit were found to be comparable.

Figure 11:
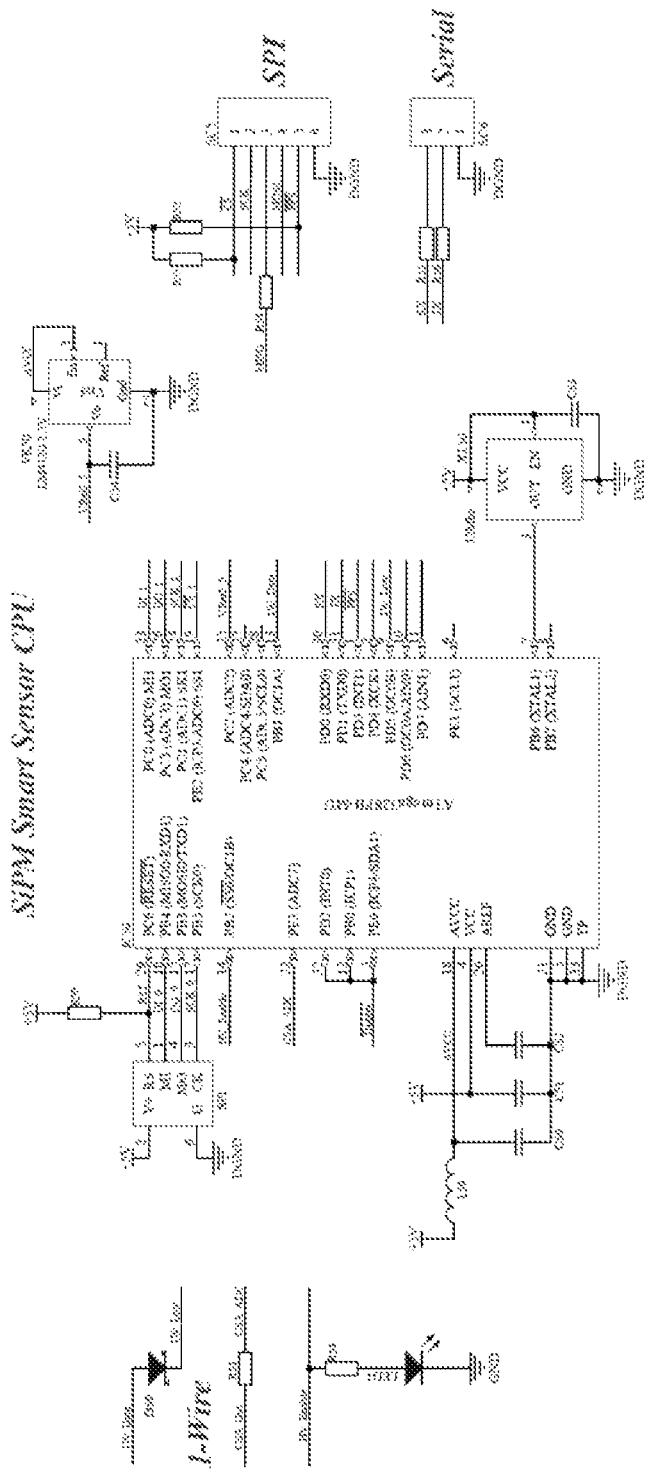
FIG. 11 is a schematic system level diagram of an exemplary local microcontroller suitable for use in the sensor of FIGS. 1-4.

Referring again to FIG. 1, the output trigger signal 130 from edge-peak detector 108 is transmitted to timer module 131 of local microcontroller 110, while amplified electrical signal 126 is transmitted from CSA 126 directly to ADC module 128 of local microcontroller 110. A system level diagram of an exemplary local microcontroller 110 is illustrated schematically in FIG. 11. Here, microcontroller 110 comprises an ATmega328PB microcontroller device developed by Microchip Technology Inc.

As best shown in FIG. 1, timer module 131 includes a timing circuit configured to generate timestamp values for each of the detected pulses in response to the detected pulse edge. The timing circuit of timing module 131 is also responsible for synchronising the timestamp values with a reference clock signal to generate timestamp values for each of the pulses detected by edge-peak detector 108. In the illustrated embodiment, the clock signal is an externally generated pulse per second (PPS) signal 133. Use of an external clock signal allows for synchronising the pulse timing of sensor 100 with that of other sensors for coincidence detection.

In conjunction with the external clock signal, timer module 131 may also generate a local internal clock signal (such as from a crystal or atomic oscillator device integrated onto circuit board 112). Where sensor 100 is used as a standalone device, this internal clock signal may be sufficient for timestamping and no external clock signal required. Where multiple sensors are used for coincidence detection, the internal clock signal may be used for local timestamping of the detected pulses and these timestamps can be subsequently synchronised with those of other sensors using a common external clock signal (as described below).

A suitable internal crystal oscillator for use in timer module 131 is a KC5032 A-CM manufactured by Kyocera Kinseki Corporation, which generates a clock frequency of 12 MHz with a tolerance of ±0.005%. A divide by 8 prescaler may be used to derive the subsequent local clock timer. With this arrangement, the expected counts from sensor 100 over 1 second (1 PPS cycle) is $1.5 \times 10^6$. However, due to the frequency tolerance of the crystal (i.e. ±0.005%), the timing count value from timer module 131 could have a deviation of ±75 clock cycles, which equates to ±49.95 µs.

Local microcontroller 110 also includes ADC module 128, which is configured to record pulse height values of the electrical pulses output from CSA 106. In the illustrated embodiment, ADC module 128 is a 10-bit device which digitises the CSA output amplified signal 126 (in a range 0 V to +5V) with a resolution of ~4.88 mV. In order to obtain better precision, the calibration of the ADC quantisation steps was performed against an external +2.5 V reference.

Finally, local microcontroller 110 includes a communications interface in the form of serial peripheral interface (SPI) port 135 configured to communicate the timestamp values and pulse height values to an external memory device or to coincidence radiation detection device 300 for subsequent processing in a manner described below. In some embodiments, the local microcontroller 110 includes a local memory component such as a Random Access Memory (RAM) or Electronically Erasable Programmable Read-Only Memory (EEPROM) device and the timestamp values and pulse height values are stored locally.

In the illustrated embodiment, local microcontroller 110 also includes RS232 communications port 137 adapted for sending and receiving data to a PC for diagnostic purposes or when using sensor 100 as a stand-alone device. In other embodiments, it will be appreciated that data may be transmitted to and from local microcontroller 110 via any known communication type including an Ethernet connection, USB, coaxial connection, optical fibre, LoRA, WiFi or Bluetooth connection.

For a given bias voltage, the gain of SiPM 102 is affected by temperature. Hence a temperature sensor 139 is mounted close to SiPM 102, which is in communication with local microcontroller 110 and used to monitor and record the SiPM temperature. If needed, correction for drift in gain can be performed in post-processing by factoring referencing temperature values at times corresponding to pulse detection. By way of example, temperature sensor 139 may be a DS18B 20U digital temperature sensor device manufactured by Maxim Integrated Products, Inc, which communicates through a 1-wire interface to local microcontroller 110.

For coincidence purposes, the timing circuit of timer module 131 generates 21-bit timestamping information and is synchronised with an external pulse per second timer. In other embodiments, the timing circuit preferably includes at least a 17-bit timer.

To effectively detect the occurrence of sub-atomic particles such as muons, the timer module 131 should fulfil the following two timing criteria:

The timer should run for at least 1 PPS (i.e. 1 second) without overflow; and

The timer should have a timing resolution of less than 1 µs.

To meet the above criteria, there is a need for at least a 20-bit timer. However, as many common microcontroller components commercially available only include 16-bit timers, the inventors have developed a method to generate a 21-bit timer by combining two 16-bit timers operating at different speeds but being derived from a common clock source.

Figure 12:
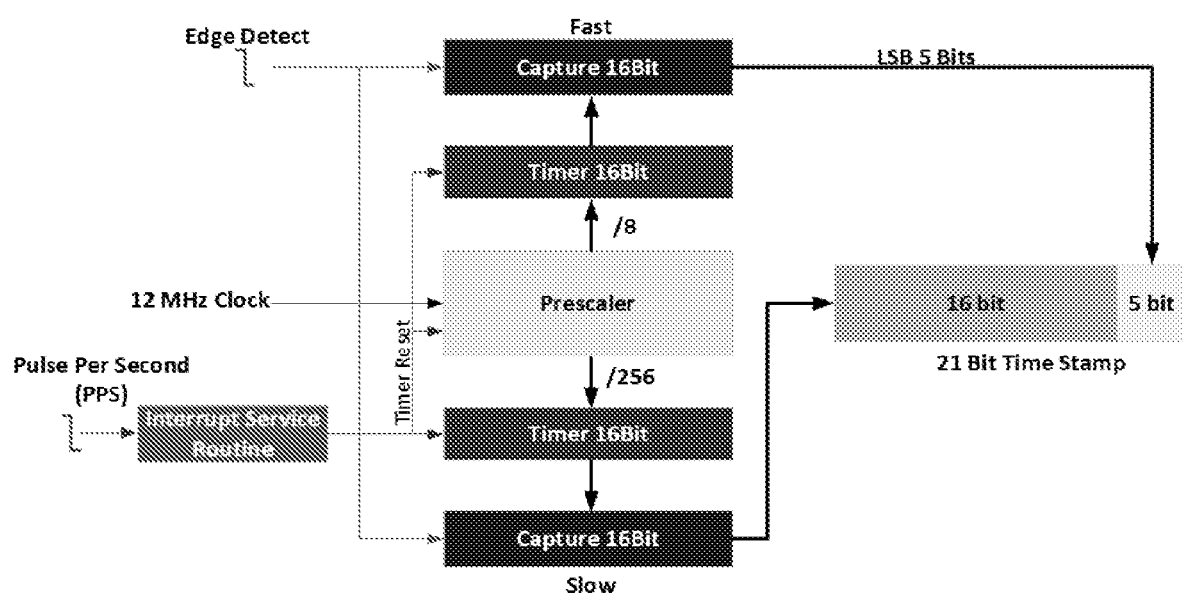
FIG. 12 is a process flow diagram illustrating schematically the process of combining two 16-bit timers to produce a 21-bit timer.

Using this method, timer module 131 operates as an event capture module and leverages, from the available timer (or counter) resources on-board local microcontroller 110, a fast 16-bit timer running at a frequency of 1.5 MHz and a slow 16-bit timer running at a frequency of 46,875 kHz. The 16-bits of the slow timer are combined with the 5 least significant bits of the fast timer to make up the 21-bit timer, as illustrated schematically in FIG. 12. In this method, the eleven most significant bits of the fast timer match/overlap with the eleven least significant bits of the slow timer. The overlapping eleven significant bits are used to detect mis-synchronisation of the counters.

A similar technique of combining two 16-bit timers operating at different speeds can be employed to implement a timer in the range of 17 to 31 bits. More generally, the 16-bits of the slow timer are combined with the 1 to 15 least significant bits of the fast timer to produce the 17 to 31-bit timer. Generally, the fast 16-bit timer should be configured to run in the MHz range and the slow 16-bit timer to runs in the KHz range. In some embodiments, the combination of the two timers is performed by components of the timing circuit.

Coincidence Radiation Detection Device

Figure 3:
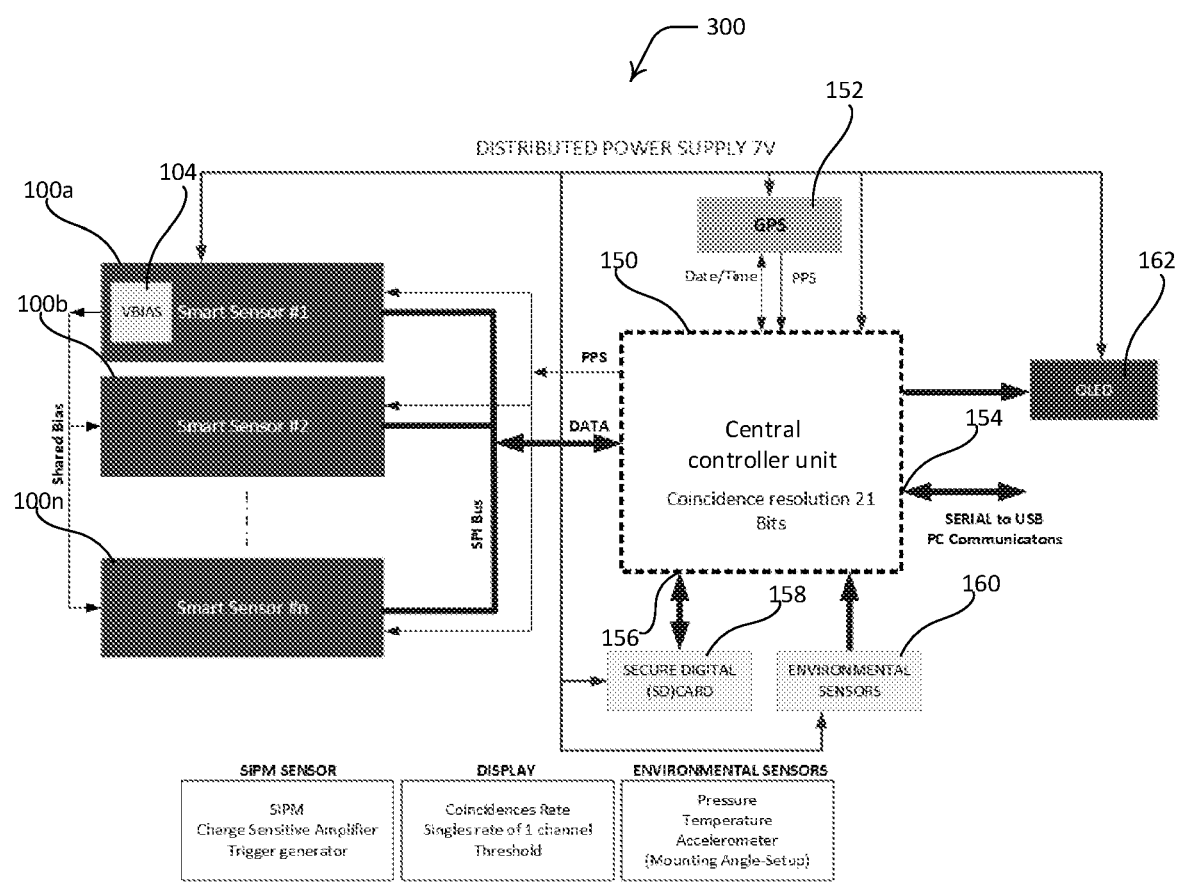
FIG. 3 is a schematic system-level diagram of a coincidence radiation detection system including a plurality of sensors as illustrated in FIG. 1.

Referring now to FIG. 3, the operation of coincidence radiation detection device 300 will be described.

Device 300 includes a plurality of sensors 100a-n similar to those described above for individually performing detection of incident radiation events of charged sub-atomic particles. As illustrated, only sensor 100a includes a bias voltage circuit 104, which is connected to an external power source (not shown), and this sole bias voltage is shared across the other sensors in parallel. It will be appreciated that, in different embodiments, more than one sensor may include a bias voltage circuit or bias voltage circuit 104 may be located separate to each sensor and connected in parallel across each sensor to provide a common bias voltage.

Device 300 also includes a central controller unit 150 in data communication with each of sensors 100a-n via an SPI bus or another data communication protocol. Central controller unit 150 is configured to receive the timestamp values and pulse height values periodically or in real-time from each sensor 100a-100n and perform synchronisation of the reference clock signals of each sensor to a common clock signal (PPS) such as a GPS signal from a GPS module 152. Alternatively, or in conjunction with the synchronisation, central controller unit 150 may also distribute the common clock signal to each sensor as a reference clock signal. In other embodiments, GPS module 152 may be replaced with any other suitable high precision clock source.

Central controller unit 150 may comprise or leverage any commercially available device. However, by way of example, central controller unit may be an ATMega328PB or ATMega2560 device, both of which are developed by Microchip Technology Inc. In some embodiments, a PC may be used as a proxy central controller unit 150.

Central controller unit 150 subsequently evaluates the timestamp values and pulse height values to determine coincidence events in which pulses are detected within a predetermined time window across at least two of the sensors. In various embodiments, central controller unit 150 may be programmed to process the timestamp values and pulse height values periodically (at predetermined intervals), in real-time or near real-time depending on specific data and power requirements for the application.

In addition to processing the data, central microprocessor 150 is able to store the data for offline coincidence analysis or historical data analysis. To perform data storage, central controller unit 150 includes a serial to USB communication port 154 (e.g. RS232 to USB converter) for connecting the controller to a PC or other data storage and processing device. Central controller unit 150 also includes a SD memory card slot 156 for receiving a SD memory card 158 for local data storage. In some embodiments, central controller unit 150 includes internal memory such as RAM or EEPROM for locally storing and/or buffering the timestamp values and pulse height values from each sensor.

Central controller unit 150 is also in data communication with various sensor devices such as environmental sensors 160 for receiving pressure and/or temperature data of a local environment in which device 300 is located. Environmental sensors 160 may include commercially available temperature and pressure sensors. By way of example, device 300 may be located in an underground mine site subject to high temperature and pressure. Central controller unit 150 may also be in data communication with an accelerometer for receiving data indicative of an orientation of device 300 in two or more dimensions. By way of example, central controller unit 150 may include an on-board micro-electromechanical system (MEMS) accelerometer to determine the gravitational vector and the orientation of device 300 is determined by central controller 150 based on this gravitational vector. Environmental data of pressure and angle are important as the count rate of charged cosmic particles such as muons depends on these parameters.

As central controller unit 150 does not perform any critical-timing tasks (this is performed by the local microcontrollers), enough resources are available for carrying out background tasks in running the equipment and communicating with external devices without the loss of critical data. In operation, central controller unit 150 configures GPS module 152 and collects the time and date information. Central controller unit 150 also distributes the PPS common clock signal to sensors 100a-n from GPS module 152. If GPS module 152 or another external clock source is not present or inactive, an internal clock of central controller unit 150 (such as a crystal oscillator) may serve as the source of the common clock signal.

Central controller unit 150 stores the timestamped data on SD card 158, monitors and records the data from environmental sensors 160 (e.g. pressure, temperature and resting angle), displays statistics (configuration count, coincidence count, singles rate and a simple histogram of pulse heights) onto an optional associated OLED display 162. The central microprocessor 150 transfers the stored data or real-time coincidence data to a PC via USB port for further analysis.

As mentioned above, each sensor 100a-n preferably has its own local clock (e.g. crystal oscillator) and the individual timers of the sensors must be brought to a common time frame for coincidence timing measurement by using a shared external PPS common clock signal. In device 300, the PPS common clock signal serves a dual purpose:

1) It resets the timestamp counters and advances the seconds counter in each sensor, thus synchronizing all connected sensors at PPS intervals; and
2) It serves as a master reference to quantify the inherent frequency tolerance error in each crystal oscillator of the sensors after each PPS synchronisation.

The coincidence window for the above described coincidence system is −1.32 µs (i.e. ±1 timer count). After reset/resync from the PPS clock signal, if the arrival of a scintillation event triggers all sensors 100a-n, a coincidence should be recorded but, due to the drift/deviation caused by a finite crystal tolerance, although a coincidence has occurred, the recorded timing value of the individual sensors may not indicate the coincidence. As each timestamp is being generated (in real-time), a Correction Factor (CF) calculated at the end of the previous PPS cycle is applied. An example calculation of a Correction Factor is provided below. As the crystals are inherently stable within the range of seconds, it is possible to use a correction factor calculated from the previous PPS cycle and apply it to the event timestamps in the next consecutive PPS cycle. This correction factor may be calculated and applied by local microcontroller 110.

To validate the correction, a first test was performed without a correction factor and GPS as the PPS source, and results showed deviation from the coincidence window. Two further sets of tests were performed, under similar conditions, one using GPS as the PPS source, and the second, a local reference timer as the PPS source, with the appropriate correction factor applied. It was found that the final event timestamp values were within the coincidence window for both the cases. An example of sample timestamped data stream for the three test cases mentioned above, is illustrated in FIG. 13.

As an objective of preferred embodiments of the present invention is to design a low cost and scalable coincidence system using off the shelf components, crystal oscillators with tolerance of +/−0.005% have been used. It is possible to source and replace them with lower tolerance crystal oscillators. However, even with a crystal frequency tolerance of 0.002%, the deviation would be +/−30 clock cycles (~20 µs), which is greater than the coincidence window of −1.32 µs, necessitating the application of a correction factor.

Example Correction Factor Calculation

When a PPS signal arrives, a Final_Count value from each of the individual timers is recorded, and then the timers are reset. A Count_Error value is the deviation of the Final_Count value from an Expected_Final_Count value of ($1.5*10^6$) at the end of every PPS cycle. The Count_Error value for a given sensor is calculated and the appropriate correction factor applied to the timestamp of every event captured by the particular sensor over the next PPS cycle. Thus, each event is correctly timestamped in real-time. A similar procedure is followed for all the sensors, all of which use the same PPS source.

$$\text{Count\_Error} = \text{Final\_Count} - \text{Expected\_final\_count} \qquad (3)$$

This Count_Error is used as an index into a lookup table containing pre-calculated CF values.

Calculation of CF $$\text{CF} = 1.5*10^6 / \text{Final\_Count} \qquad (4)$$

The binary format of equation 4 can be expressed as:

(N1.Q32)=(N21.Q0)/(N21.Q0)

where CF is a 33-bit number, only the fractional (Q32) needs to be stored in the table as the most significant bit of the number can be ascertained from the sign of the final equation.

Typical Example

Final_Count=1,500,041

CF=1,500,000/1,500,041=0.999972667413757

This CF is then converted to 32-bit factional number and placed in a lookup. Example: 0.999972667413757= 0xFFFE356F i.e. (N0.Q32)

CONCLUSIONS

It will be appreciated that the above described coincidence radiation detection device 300 provides a low-cost, light-weight, low power, portable coincidence system capable of being constructed based on autonomous smart sensors 100a-n using off-the-shelf SiPMs and microcontrollers. The system is suitable for detecting radiation events within a coincidence window of −1.32 µs, which includes charged particle events such as muons. It is possible to obtain a narrower coincidence window by adding more bits to the timer. Such a modification could potentially result in achieving 0.67 µs or 0.34 µs windows respectively for 22 bit and 23 bit timers using a 12 MHz clock. However, other limiting factors will come into play in achieving shorter coincidence windows, such as possible edge detector jitter and a larger look-up table.

Software techniques have been developed which allow the device to perform real-time self-compensation and synchronisation of multiple smart sensors with an external GPS or a self-referencing clock. The system is suitable for surface and subterranean coincidence based measurements. Each sensor 100a-n has good timing accuracy through a combination of the SiPM plus a software generated timing system with 21-bit precision.

The use of SiPMs reduces the power consumption, high voltage requirements, cost and physical dimensions of the system relative to traditional photomultiplier tubes. There are, however, disadvantages in using SiPMs in that they possess a large dark current and have an inherent capacitance. In the present invention, the former disadvantage is mitigated by setting a higher detection threshold, the latter by implementing an on-board electronics charge sensitive amplifier.

In some embodiments, a single bias power supply is able to feed multiple sensors. A single bias voltage supply circuit feeding multiple sensors gives a constant power source without further regulation. This reduces the electronics required and the noise generated. Both of these are disadvantages commonly encountered when using multiple scintillation detectors but are addressed in the present invention.

Specifically designed electronic systems, including microcontrollers, as well as specific control software enable accounting for timing drift and enable real-time coincidences within a coincidence-window of −1.32 µs. A novel hybrid timing system combining two 16-bit timers provides 21-bit timing created from inexpensive, crystal clock sources with high frequency tolerance.

An advantage of having real time coincidence capability, as well as inbuilt storage for offline analysis, allows great flexibility with a 'plug-and-play' approach that is far from standard in more expensive designs.

The modular and rugged design supports real-time coincidence as well as offline analysis, and permits easy scalability to fewer or greater numbers of sensors 100a-n without reconfiguring the remaining device. These advantages make it more suitable for deployment in environments typically deemed harsh for electronics, such in subterranean mining operations where high temperature, pressure and limited power supply are encountered.

Deploying a number of devices 300 at several locations concurrently permits event reconstruction and absorption studies; known as muon tomography. This process has great potential in resource exploration both by reducing the number of exploration boreholes required to map green field sites as well as improving the identification and recovery of ore bodies within existing sites.

Long term deployment of these cost effective and rugged radiation sensors allows passive, non-invasive monitoring of rock stability and air cavity formation in block caving, as well as mining sites more generally. This can be extended to long term monitoring of the stability of carbon sequestration sites for example.

The present invention is also a viable option for a range of applications such as education and outreach, for globally distributed coincidence systems, medical imaging, and background radiation detection in homes, industry and academia.

Interpretation

Unless specifically stated otherwise, as apparent from the following discussions, it is appreciated that throughout the specification discussions utilizing terms such as "processing," "computing," "calculating," "determining", analysing" or the like, refer to the action and/or processes of a computer or computing system, or similar electronic computing device, that manipulate and/or transform data represented as physical, such as electronic, quantities into other data similarly represented as physical quantities.

In a similar manner, the term "microcontroller", "controller" or "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Reference throughout this specification to "one embodiment", "some embodiments" or "an embodiment" means that a particular feature, structure or characteristic described in connection with the embodiment is included in at least one embodiment of the present disclosure. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of exemplary embodiments of the disclosure, various features of the disclosure are sometimes grouped together in a single embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

Embodiments described herein are intended to cover any adaptations or variations of the present invention. Although the present invention has been described and explained in terms of particular exemplary embodiments, one skilled in the art will realize that additional embodiments can be readily envisioned that are within the scope of the present invention.

What is claimed is:

1. A muon sensor for detection of muons and for a radiation detection device, the muon sensor including a single integrated circuit board comprising:
   a bias voltage power supply circuit located on the circuit board and configured to receive a signal from an external power source and generate an input power signal;
   a silicon photomultiplier device powered by the input power signal and configured to receive incident optical pulses of photons from an associated scintillator device and, in response, generate an input electrical signal having corresponding electrical pulses, wherein the scintillator device is configured to convert energy from incident muons into the optical pulses of photons;
   a charge sensitive amplifier configured to receive the input electrical signal and output an amplified electrical signal in which the electrical pulses are amplified and stretched in time;
   an edge-peak detector circuit configured to detect:
      a fast rising edge of the electrical pulses;
      a beginning of a trailing edge of the electrical pulses; and
      a pulse peak value being a voltage value measured at the beginning of the trailing edge of the electrical pulses;
   a local microcontroller having:
      a timing circuit configured to generate timestamp values for each of the detected pulses in response to a detected pulse edge and to synchronise the timestamp values with a reference clock signal to generate timestamp values for the pulses;
      an analog to digital converter configured to record pulse height values of the electrical pulses; and
      a communications interface configured to communicate the timestamp values and pulse height values to a memory device.

2. The muon sensor according to claim 1 wherein the reference clock signal is an internally generated signal from a crystal oscillator device.

3. The muon sensor according to claim 1 wherein the reference clock signal is an external timing signal received from an external device.

4. The muon sensor according to claim 1 including a temperature sensor mounted close to the silicon photomultiplier device and in communication with the local microcontroller for monitoring a temperature of the silicon photomultiplier device.

5. The muon sensor according to claim 1 wherein the charge sensitive amplifier includes an operational amplifier circuit.

6. The muon sensor according to claim 1 wherein the charge sensitive amplifier includes a pair of back-to-back Schottky diodes connected across the input of an operational amplifier.

7. The muon sensor according to claim 1 wherein the bias voltage power supply circuit includes a hybrid power supply circuit to convert an unregulated power signal to the input power signal delivered to the silicon photomultiplier device.

8. The muon sensor according to claim 7 wherein the hybrid power supply circuit includes a combination of a switch mode power supply regulator and a linear regulator to reduce voltage ripple in the input power signal.

9. The muon sensor according to claim 1 wherein the timing circuit includes at least a 17-bit timer.

10. The muon sensor according to claim 9 wherein the timing circuit includes a timer in the range of 17 to 31 bits that is formed of two 16-bit timers operating at different speeds.

11. The muon sensor according to claim 10 wherein the 17 to 31-bit timer is formed of a 16-bit fast timer and a 16-bit slow timer, wherein the 16-bits of the slow timer are combined with the 1 to 15 least significant bits of the fast timer to produce the 17 to 31-bit timer.

12. The muon sensor according to claim 11 wherein the fast 16-bit timer runs in the MHz range and the slow 16-bit timer runs in the kHz range.

13. A muon coincidence radiation detection device comprising:
- a plurality of muon sensors according to claim 1; and
- a central controller unit in data communication with each of the plurality of muon sensors, the central controller unit configured to:
  - receive the timestamp values and pulse height values from each muon sensor;
  - synchronise the reference clock signals of each sensor to a common clock signal; and
  - process the timestamp values and pulse height values in conjunction with the common clock signal to determine coincidence events in which pulses are simultaneously detected across at least two of the sensors.

14. The muon coincidence radiation detection device according to claim 13 wherein the central controller unit processes the timestamp values and pulse height values in real-time or near real-time.

15. The muon coincidence radiation detection device according to claim 13 wherein the central controller unit is in data communication with one or more sensor devices for receiving pressure and/or temperature data of a local environment in which the muon coincidence radiation detection device is located.

16. The muon coincidence radiation detection device according to claim 13 wherein the central controller unit is in data communication with an accelerometer for receiving data indicative of an orientation of the device.

17. The muon coincidence radiation detection device according to claim 13 wherein the central controller unit includes memory for storing the timestamp values and pulse height values from each sensor.

18. The muon sensor according to claim 1, wherein the bias voltage power supply circuit is configured to share a bias voltage across other sensors in parallel.

\* \* \* \* \*